United States Patent [19]

Pyle

[11] 4,322,326

[45] Mar. 30, 1982

[54] ETHYLENE-VINYL ESTER COPOLYMER BLENDED WITH DIBASIC ACID-MODIFIED ROSIN ESTER

[75] Inventor: Lorrin W. Pyle, Cincinnati, Ohio

[73] Assignee: National Distillers & Chemical Corp., New York, N.Y.

[21] Appl. No.: 232,794

[22] Filed: Feb. 9, 1981

[51] Int. Cl.$^3$ .................. C08L 93/04; C08L 93/00
[52] U.S. Cl. .................. 524/513; 527/604; 525/54.44
[58] Field of Search .................. 260/27 EV

[56] References Cited

U.S. PATENT DOCUMENTS 3,652,474  3/1972  Berry et al. .................. 260/27 EV
4,168,253  9/1979  Hollis .................. 260/27 EV

FOREIGN PATENT DOCUMENTS 713126    7/1965   Canada .................. 524/272
49-11933  2/1974   Japan .................. 524/272
1167616   10/1969  United Kingdom .................. 524/272

*Primary Examiner*—H. S. Cockeram
*Attorney, Agent, or Firm*—Kenneth D. Tremain

[57] ABSTRACT

A coating composition of enhanced physical characteristics such as those of hardness, flexibility and/or ultraviolet resistance is provided which comprises a mixture of ethylene-vinyl ester copolymer containing at least about 55% by weight of interpolymerized vinyl ester and a dibasic acid-modified rosin ester of a rosin acid and a polyhydric alcohol containing from 2 to 6 hydroxyl groups, said dibasic acid-modified rosin ester being present in said composition at a level of at least about 30% by weight.

7 Claims, No Drawings

ETHYLENE-VINYL ESTER COPOLYMER BLENDED WITH DIBASIC ACID-MODIFIED ROSIN ESTER

BACKGROUND OF THE INVENTION

1. Field of the Invention

This invention relates to the field of synthetic resins containing modified natural resins and, more particularly, to blends of ethylene-vinyl ester copolymer and dibasic acid-modified rosin ester.

2. Description of the Prior Art

Numerous adhesive compositions, largely of the hot melt variety, containing an ethylene-vinyl ester copolymer and a resin and/or rosin-based tackifying agent are known. Illustrative of such compositions are the adhesive materials disclosed in U.S. Pat. Nos. 2,485,248; 3,232,895; 3,484,405; 3,657,171; 3,849,353; 4,140,733; 4,167,433; 4,168,253; and 4,183,384. The compositions described in the last mentioned patent, U.S. Pat. No. 4,183,384, are fairly representative of the prior art adhesives and are prepared from a latex such as an ethylene-vinyl acetate latex and, as a tackifying agent, an aqueous dispersion of a resinous polyelectrolyte prepared from the reaction product of a rosin, a monoalcohol and a carboxylic acid, e.g., a dibasic unsaturated acid.

Ethylene-vinyl ester copolymers employed in known hot melt adhesive systems typically possess a vinyl ester content, usually vinyl acetate, of from about 10 to 30% by weight. Copolymers possessing this range of vinyl ester content are unsuitable for blending with rosin esters in many common solvent systems due to their relatively poor solubility. The use of ethylene-vinyl ester copolymers in the 40 to 45% by weight vinyl ester range (which are soluble in a variety of organic solvents) as modifiers for nitrocellulose and chlorinated rubber is well known. However, at this level of vinyl ester, such copolymers have been found to be incompatible with dibasic acid-modified rosin esters in any useful proportions. While incompatability is unimportant insofar as the hot melt adhesives are concerned since appearance is not a significant consideration with these products, coating materials must possess an acceptable degree of clarity to be regarded as commercially useful.

SUMMARY OF THE INVENTION

In accordance with the present invention, a composition containing ethylene-vinyl ester copolymer and dibasic acid-modified rosin ester is provided which, when deposited upon a substrate from an organic solvent solution, provides a clear coating having enhanced physical characteristics such as those of hardness, flexibility and/or ultra-violet radiation resistance.

Broadly stated, the composition of this invention comprises a mixture of ethylene-vinyl ester copolymer containing at least about 55% by weight interpolymerized vinyl ester and a dibasic acid-modified rosin ester present in said mixture at a level of at least about 30% by weight of said mixture.

The composition herein is especially useful as a solvent-deposited coating material possessing superior physical characteristics as aforedescribed including excellent clarity and adhesion to the substrate.

DESCRIPTION OF THE PREFERRED EMBODIMENTS

The ethylene-vinyl ester copolymer component of the compositions of this invention contain from about 55% to about 95%, and advantageously from about 60 to about 75% by weight, of a vinyl ester selected from vinyl formate, vinyl acetate, vinyl n-propionate, vinyl isopropionate, vinyl n-butyrate, vinyl sec-butyrate and vinyl tert-butyrate, with ethylene-vinyl acetate copolymer being preferred due to its ready availability and readily low cost. Up to 5% by weight of the vinyl ester component can be replaced with a like amount of one or a mixture of monomers which is copolymerizable with ethylene and vinyl ester, e.g., a vinyl halide such as vinyl chloride; a vinylidene halide such as vinylidene chloride; acrylic and alpha-alkyl acrylic acids, e.g., acrylic acid and methacrylic acid; an alkyl ester of such an acid, e.g., methyl acrylate, ethyl acrylate, methyl methacrylate; an amide of such an acid, e.g., acrylamide, methacrylamide; unsaturated nitriles, e.g., acrylonitrile, methacrylonitrile, ethacrylonitrile; a vinyl aromatic, e.g., styrene and alpha-alkyl styrene; dialkyl esters of maleic acid, e.g., dimethyl maleate and the corresponding fumarates; vinyl alkyl ethers and ketones, and the like. The ethylene-vinyl ester copolymers, including those prepared with minor quantities of additional comonomers, constitute a well known class of resins which are not a part of the present invention per se.

The dibasic acid-modified rosin esters employed in the compositions of the present invention are derived from esters of rosin acids and polyhydric alcohols containing 2 to 6 hydroxyl groups, the esters being subsequently modified with a dibasic acid. Such esters and methods for their preparation are described, for example, in *Encyclopedia of Polymer Science and Technology*, Interscience Publishers, a division of John Wiley & Sons (New York, 1964), Vol. 12, pp. 139–164, which is incorporated by reference herein. Rosin esters which can be used in the preparation of the dibasic acid-modified materials include ethylene glycol ester of rosin, diethylene glycol ester of rosin, triethylene glycol ester of hydrogenated rosin, ethylene glycol ester of polymerized rosin, glycerol ester of rosin, glycerol ester of hydrogenated rosin, glycerol ester of perhydrogenated rosin, glycerol ester of polymerized rosin, pentaerythritol ester of rosin, pentaerythritol ester of perhydrogenated rosin, sorbitol ester of rosin, and the like. The rosin esters are modified in a known manner with one or more dibasic acids such as adipic acid, maleic acid, malonic acid, fumaric acid, azelaic acid, citraconic acid, and the like. For example, fumaric acid and maleic anhydride react with rosin acids in accordance with the Diels-Alder mechanism to form tribasic acid adducts. The reaction is mole/mole, about 202 grams rosin acid/98 grams maleic anhydride. Dibasic acid modification may be from 1% to approximately 50% of the weight of the rosin acid. Dibasic acid-modified pentaerythritol ester of rosin such as Cellolyn 102 (Hercules, Inc.) is especially preferred.

The dibasic acid-modified rosin esters must be present at a level of 30% by weight of the ethylene-vinyl ester copolymer component (dry solids) in order to demonstrate significantly enhanced levels of hardness, flexibility and/or ultra-violet resistance compared to the levels of such properties possessed by the copolymer alone. The upper limit of rosin ester is not critical and can represent 90% by weight or more of the total composition. In general, best results are obtained with relatively high levels of dibasic acid-modified rosin ester e.g., at levels of from about 60% to about 80% by weight.

The compositions herein may contain one or more other resins, for example, natural and synthetic rubbers, polyvinyl acetates and acetals, nitrocellulose, cellulose esters, vinyl and vinylidene halide resins, especially the vinyl and vinylidene chlorides, and so forth, up to the limit of compatibility therein. It is, of course, within the scope of the invention to include in the compositions other ingredients such as pigments, colorants, fillers, antioxidants, stabilizers, etc., in the usual amounts.

The ethylene-vinyl ester copolymer, dibasic acid-modified rosin ester and additional resin(s), if present, can be combined using known and conventional melt blending techniques or they can be provided as a solution of one or a mixture of organic solvents. Suitable solvents include the aromatic hydrocarbons, particularly benzene, toluene, and the xylenes, high boiling aromatic (an 80:20 mixture of aromatic and aliphatic hydrocarbon solvents), ketones such as acetone, methyl-ethyl ketone methylisobutyl ketone, esters such as methyl acetate, ethyl acetate, propyl acetate, butyl acetate, and so forth. Toluene is especially preferred. The individual components of the composition herein can be introduced into the solvent or solvent mixture individually or as a blend up to the limit of solubility in the solvent. In general, solutions of maximum solids content, for example, from about 40 to about 50 weight parts solids, are preferred since the solvent(s) is merely a vehicle for the deposition of the compositions herein upon a surface to provide a coating thereon following evaporation of the solvent(s).

In the examples which follow, the following test methods were employed to determine the suitability of a number of compositions, both within and outside the scope of the present invention, as lacquer coatings.

Test Methods

1. Pencil Hardness (H. A. Gardner and G. G. Sward, *Physical and Chemical Examination: Paints, Varnishes, Lacquers and Colors,* Gardner Lab., Inc. Bethesda, Md., 1962, page 131): one less hardness of lead required to just break the film. Hardness increases with increase in H-value and decreases with increase in B-value.

2. Sward Rocker Hardness (same references as 1, supra, page 160): oscillation of two 4-inch metal rings spaced one inch apart on the film surface. The total time required for the amplitude of oscillation to decay by a fixed amount corresponding to a certain number of complete oscillations is a measure of the hardness.

3. T-Bend Flexibility (*Paint/Coatings Dictionary* Federation of Societies for Coatings Technology 1315 Walnut Street, Suite 832, Philadelphia, Pa. 19107, page 4160: number of metal thicknesses between folds when no cracking occurs.

4. Cross Hatch Adhesion (same reference as 1, supra, page 160): adhesive tape is applied at an inscribed cross hatch and quickly pulled off (3M Company Tape No. 665).

5. Fadeometer (*Twin Carbon Arc, SLTS Weather-O-meter No. Wo* 521, Atlas Electric Devices, 4114 North Ravenwood Avenue, Chicago, Ill. 60611): Twin carbon arc, air temperature at 125°±5° F.

6. Viscosity-Brookfield, Model RVF 100, 20 RPM at 75°±2° F.

7. Chemical Resistance-ASTM D1309-57.

8. Gloss (*Gardner* 60° *Glossmeter,* Gardner Lab., Inc. Bethesda, Md.): 60° C.

| Ethylene-Vinyl Ester Copolymers Evaluated | | |
|---|---|---|
| | Melt Flow Index | Vinyl Acetate (% by wt.) |
| EY*901 | 0.60 | 40.3 |
| EY 903 | 0.33 | 46.1 |
| EY 906 | 1.0 | 57.61 |
| EY 907 | 10.6 | 61.0 |

*This series of ethylene-vinyl acetate copolymers is available from U.S. Industrial Chemicals Company.

Results

The results of the tests set forth below in Table I show that an ethylene-vinyl ester copolymer having a minimum vinyl ester content of about 55% by weight is critical to obtaining compatibility (Examples 9 to 16).

TABLE I

COMPATIBILITY RESULTS OF ETHYLENE VINYL ESTER COPOLYMER/PENTAERYTHRITOL ESTER OF DIBASIC ACID-MODIFIED ROSIN (CELLOLYN 102)

| Example | % by wt. Vinyl Acetate | Ethylene-Vinyl Acetate/Dibasic Acid-Modified Rosin Ester (Cellolyn 102) | | | | Film Appearance |
|---|---|---|---|---|---|---|
| | | 1-1 | 1-2 | 1-3 | 1-4 | |
| 1 | 40 | Incompatible | — | — | — | Tacky, cloudy blue |
| 2 | 40 | | Incompatible | — | — | V. Sl. tack, blue |
| 3 | 40 | | | Incompatible | — | Blue, no tack, brittle |
| 4 | 40 | | | | Incompatible | Blue, no tack, brittle |
| 5 | 45 | Incompatible | — | — | — | Tacky, cloudy blue |
| 6 | 45 | | Incompatible | — | — | Bluish, sl. tack |
| 7 | 45 | | | Incompatible | — | Blue haze, no tack, brittle yellow |
| 8 | 45 | | | | Incompatible | Bluish film, brittle, yellow |
| 9 | 57 | Incompatible | — | — | — | Sl. bluish, tacky film |
| 10 | 57 | | Compatible | — | — | V.V. Sl. Blue, no tack |
| 11 | 57 | | | Compatible | — | Clear film, brittle, yellow |
| 12 | 57 | | | | Compatible | Clear film, brittle, yellow |
| 13 | 61 | Incompatible | — | — | — | Sl. bluish, tacky, film |
| 14 | 61 | | Compatible | — | — | Clear, hard, flexible film |
| 15 | 61 | | | Compatible | — | Clear, brittle, yellow film |
| 16 | 61 | | | | Compatible | Clear, brittle, yellow |

TABLE I-continued
COMPATIBILITY RESULTS OF ETHYLENE VINYL ESTER COPOLYMER/PENTAERYTHRITOL ESTER OF DIBASIC ACID-MODIFIED ROSIN (CELLOLYN 102)

| Example | % by wt. Vinyl Acetate | Ethylene-Vinyl Acetate/Dibasic Acid-Modified Rosin Ester (Cellolyn 102) | | | | Film Appearance |
|---|---|---|---|---|---|---|
| | | 1-1 | 1-2 | 1-3 | 1-4 | |
| | | | | | | film |

Examples 1 to 4: EY 901;
Examples 5 to 8: EY 903;
Examples 9 to 12: EY 906;
Examples 13 to 16: EY 907.

As shown below in Table II, for flexibility, adhesion, gloss and solution viscosity, the 1-2 ratio EY 907/Cellolyn 102 is equal to (better for solution viscosity) than the control formula. Only in hardness is this composition slightly deficient. Since these are clear formulation, the lower viscosity of the 1-2 ratio composition is an advantage in that higher pigment loading makes it possible to maintain flexibility and adhesion. Hardness may also be increased by increasing the rosin ester content with some sacrifice in flexibility. The 1-3, 1-4 ratios are useful where flexibility is not a requirement.

As shown in the Fade-O-Meter studies summarized in Table IV below made on the three ratios of EY 907/Cellolyn 102 and the control formula, the compositions herein are superior to the control formula in retention of flexibility. This reflects the better permanence of EY 907 compared to Paraplex G-59, a relatively expensive plasticizer. Gloss and flexibility are the two properties most effected by UV exposure for the 1-2 ratio. The change in gloss is equal to the control formula and for flexibility it is much less (0-T to 2-T versus 0-T to 6-T). Film degradation is greater for the control as shown by

TABLE II
PHYSICAL PROPERTIES OF ETHYLENE-VINYL ESTER COPOLYMER AND DIBASIC ACID-MODIFIED ROSIN ESTER BLENDS
Substrate: Alodine treated aluminum, air dried 24 hrs.

| Example | EY 907/ Cellolyn 102 Ratios | Sward Hardness | Flexibility T-Bend | Adhesion Loss at Bend | 60% Gloss | Viscosity at 25% N.V. |
|---|---|---|---|---|---|---|
| 17 | 1-4 | 24 | 6-T | 95% | 10.68 | 1,570 cps. |
| 18 | 1-3 | 20 | 6-T | 20% | 9.28 | 1,312 cps. |
| 19 | 1-2 | 13 | 0-T | No Removal | 19.50 | 50 cps. |
| 20 | Control | 20 | 0-T | No Removal | 19.28 | 65 cps. |

*80% VMCC (vinyl chloride/vinyl acetate copolymer of UnionCarbide) and 20% Paraplex G-59 (high molecular weight polyester plasticizer from Rohm & Haas).

As shown below in Table III, for adhesion over some common substrates used in coating processes, the 1-2 ratio is overall equal to the more expensive control formula, but better over primed surfaces. The 1-3 and 1-4 ratios would generally be limited as topcoats over primed surfaces or the 1-3 ratios over glass and treated metal where the excellent adhesion of the control formula is not required but cost is a significant factor.

its yellowing and blistering whereas the 1-2 ratio shows no change. The 1-3 and 1-4 ratios are not flexible coatings initially but show no change after exposure. The 1-4 is equal in gloss change to the control and the 1-3 is deficient in this respect (18.8 to 6.82 versus 19.28 to 9.06). Their crazing is a serious deficiency that may not occur in exposed-over primed metal. In summary, the 1-2 ratio is the best for UV resistance.

TALBE III
ADHESION TO VARIOUS SUBSTRATES OF ETHYLENE-VINYL ESTER COPOLYMER AND DIBASIC ACID-MODIFIED ROSIN ESTER BLENDS

| | | CROSS HATCH ADHESION | | | | | | | |
|---|---|---|---|---|---|---|---|---|---|
| | EY 907/ Cellolyn 102 | 10 at 250° F. | | | | Air Dry 24 Hours | | | |
| Example | Ratios | 1-2 | 1-3 | 1-4 | Control | 1-2 | 1-3 | 1-4 | Control* |
| 21 | Cold Rolled Steel | Good | Poor | Poor | Excellent | Good | Poor | Poor | Excellent |
| 22 | Phosphatized Steel | Excellent | Good | Fair | Excellent | Excellent | Good | Good | Excellent |
| 23 | Untreated Aluminum | Good | Poor | Poor | Good | Excellent | Poor | Fair | Good |
| 24 | Glass | Excellent | Good | Fair | Excellent | Excellent | Fair | Fair | Excellent |
| 25 | Alodine Treated Aluminum | Excellent | Good | Poor | Excellent | Excellent | Fair-Good | Good | Excellent |
| 26 | Soya Alkyd Primer | Excellent | Excellent | Good | Fair | Excellent | Excellent | Good | Fair |

*VMCC (Union Carbide) a vinyl chloride/vinyl acetate copolymer of intermediate molecular weight containing 83% vinyl chloride, 16% vinyl acetate and 1% maleic acid.

TABLE IV

FADE-O-METER EXPOSURE RESULTS - 104 HOURS, AIR TEMP = 125 ± 5° F. ETHYLENE-VINYL ESTER COPOLYMER AND DIBASIC ACID-MODIFIED ROSIN ESTER BLENDS

| Example | EY 907/ Cellolyn 102 Ratios | Initial Gloss | Final Gloss | Initial Flexibility | Final Flexibility | Initial Adhesion | Final Adhesion | Film Appearance |
|---|---|---|---|---|---|---|---|---|
| 27 | ¼ | 19.2 | 9.78 | 6-T No Removal | 6-T 100% Removal | 95% Removal | 80% Removal | No yellowing, crazed |
| 28 | ⅓ | 18.8 | 6.82 | 6-T 50% Removal | 6-T 100% Removal | 20% Removal | 50% Removal | No yellowing, crazed |
| 29 | ½ | 19.5 | 9.32 | 0-T No Removal | 2-T No Removal | No Removal | No Removal | No yellowing, or crazing |
| 30 | Control* | 19.28 | 9.06 | 0-T No Removal | 6-T 100% Removal | No Removal | No Removal | Sl. yellowing Med. blisters |

*Same as control in Table II.

As shown in Table V below, for chemical resistance all ratios of EY 907/Cellolyn 102 are superior to the control in respect of water and alkali resistance (Table VII). The 1-3, 1-4 ratios are slightly inferior for ethyl alcohol and VM&P resistance. Overall, these two can be considered as equal to the control.

TABLE V

CHEMICAL RESISTANCE OF ETHYLENE-VINYL ESTER COPOLYMER AND DIBASIC ACID-MODIFIED ROSIN ESTER BLENDS

| Example | EY 907/ Cellolyn 102 Ratios | Water Test | 24 Hr. NaOH 3% | 24 Hr. Ethyl Alcohol | 5% HCl | VM&P Naptha |
|---|---|---|---|---|---|---|
| 31 | ¼ | No effect | Sl. Clouding | Soft-Clouding Loss of Adhesion | No Effect | Cloudy-Soft |
| 32 | ⅓ | Very sl. Clouding | Sl. Yellowing | Soft-Cloudy Loss of Adhesion | No Effect | Cloudy-Soft |
| 33 | ½ | Sl. Clouding | Yellowing | Soft-Cloudy Loss of Adhesion | Sl. Cloudy | Cloudy-Soft |
| 34 | Control | Blistering Soft-Cloudy | Sl. Blistering Soft-Cloudy | No Effect | No Effect | No Effect |

What is claimed is:

1. A composition comprising a mixture of ethylene-vinyl ester copolymer containing at least about 55% by weight of interpolymerized vinyl ester and a dibasic acid-modified rosin ester of a rosin acid and a polyhydric alcohol containing from 2 to 6 hydroxyl groups, said dibasic acid-modified rosin ester being present in said composition at a level of at least about 30% by weight.

2. The composition of claim 1 wherein the vinyl ester is vinyl acetate.

3. The composition of claim 2 wherein the ethylene-vinyl acetate contains from about 60 to about 75% by weight of interpolymerized vinyl acetate.

4. The composition of claim 1 wherein the dibasic acid-modified rosin ester is an ester of a rosin acid and pentaerythritol ester of rosin.

5. The composition of claim 1 containing from about 60% to about 80% by weight of dibasic acid-modified rosin ester.

6. The composition of claim 1 dissolved in an organic solvent or mixture of organic solvents.

7. The composition of claim 6 wherein the organic solvent is toluene.

* * * * *